United States Patent Office 3,444,208
Patented May 13, 1969

3,444,208
DIMERIZATION OF HYDROCARBYL VINYL KETONES
James D. McClure, Oakland, Calif., assignor to Shell Oil Company, New York, N.Y., a corporation of Delaware
No Drawing. Continuation-in-part of application Ser. No. 395,009, Sept. 8, 1964. This application Oct. 12, 1967, Ser. No. 674,766
Int. Cl. C07c *49/12, 49/76*
U.S. Cl. 260—590     10 Claims

ABSTRACT OF THE DISCLOSURE

Novel 2,4 - dihydrocarbonoyl - 1 - butenes are produced by dimerization of hydrocarbyl vinyl ketones in solution in inert, liquid reaction solvent in the presence of a catalytic amount of tertiary aromatic phosphine.

CROSS-REFERENCES TO RELATED APPLICATIONS

This application is a continuation-in-part of copending U.S. application Ser. No. 395,009, filed Sept. 8, 1964 now abandoned.

DESCRIPTION OF THE PRIOR ART

The thermal dimerization of methyl vinyl ketone is known in the art, see Alder et al., Ber., 74B, 905 (1941). When heated to about 150° C., methyl vinyl ketone cyclodimerizes to give good yields of 6-acetyl-5,6-dihydro-2-methyl-1,4-pyran. Although such cyclic dimers are of value, it would be of advantage to dimerize vinyl ketones in a manner to produce linear dimers of wider utility.

SUMMARY OF THE INVENTION

It has now been found that novel linear dimers are obtained by the process which comprises dimerizing certain hydrocarbyl vinyl ketones in liquid-phase solution in the presence of a tertiary aromatic phosphine catalyst. Under the conditions of the process of the invention 1,5-di-hydrocarbyl - 2 - methylene-1,5-diketones are produced in good yield. When analogous aliphatic phosphines are employed in similar processes, only polymer is observed as product and no dimer is producde.

DESCRIPTION OF THE PREFERRED EMBODIMENTS

The vinyl ketone reactant.—The ketone reactants of the present invention comprise a carbonyl moiety having an unsubstituted vinyl radical, $CH_2=CH-$, and a hydrocarbyl radical as substituents thereon. Preferred hydrocarbyl vinyl ketones contain only atoms of carbon and hydrogen besides the oxygen of the carbonyl moiety, contain from 4 to 9 carbon atoms, and are represented by the formula

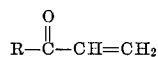

wherein R is a hydrocarbyl containing from 1 to 6 carbon atoms. The group R is saturated, i.e., is alkyl; is ethylenically unsaturated, i.e., is alkenyl; or is aryl, i.e., phenyl; but is preferably free from acetylenic unsaturation. Illustrative alkyl, both acyclic and cyclic, R groups include methyl, ethyl, isopropyl, tert-butyl, tert-amyl, hexyl, cyclopentyl, cyclohexyl and 1-methylcyclopentyl; illustrative alkenyl R substituents include vinyl, crotyl, allyl, isopropenyl, 2-butenyl, 2-methyl-3-pentenyl, 2-cyclohexenyl, 2,4-pentadienyl and 3,5-hexadienyl. In general, R groups containing only aromatic unsaturation are preferred over R groups with ethylenic unsaturation, and a preferred class of R groups comprises methyl, tert-butyl and phenyl.

Particularly preferred as the hydrocarbyl vinyl ketone reactant is methyl vinyl ketone.

The phosphine catalyst.—The hydrocarbyl vinyl ketone is dimerized in the presence of a tertiary aromatic phosphine catalyst. By the term "tertiary aromatic phosphine" as employed herein is meant a mono- to diphosphine, each phosphorus substituent of which is aromatic in character. Preferred tertiary aromatic phosphines are hydrocarbon phosphines of from 18 to 50 carbon atoms, that is, contain only atoms of carbon and hydrogen besides the phosphorus atom(s) of the phosphine moiety (moieties) and are represneted by the formula R'R'R'P or the formula R'R—P—R"—PR'R' wherein R' independently is aryl or alkaryl, preferably mononuclear, having from 6 to 10 carbon atoms, and R" is a divalent arylene radical corresponding to R'. Illustrative R' groups include phenyl, tolyl, xylyl, p-tert-butylphenyl, m-ethylphenyl, 4-methyl-3-propylphenyl,3,3,5-trimethylphenyl and naphthyl.

Tertiary aromatic phosphines containing such R' groups therefore include triphenylphosphine, tritolylphosphine, trixylylphosphine, diphenyl(p-tert-butylphenyl)phosphine, 1,4-bis(diphenylphosphino)benzene, 1,3-bis(phenyltolyl-phosphino)benzene, 1,5 - bis(ditolylphosphino)naphthalene and 2 - ethyl - 1,4 - bis(diphenylphosphino)benzene. In general, mono-phosphine catalysts are a preferred class, and particularly preferred as catalyst in the process of the invention is triphenylphosphine.

The tertiary phosphine is employed in catalytic amounts. While the optimum amount of catalyst will depend in part upon the particular ketone, phosphine catalyst and reaction conditions employed, in general, amounts of phosphine catalyst from about 0.0001 mole to about 0.2 mole per mole of hydrocarbyl vinyl ketone are satisfactory. Amounts of phosphine catalyst from about 0.001 mole to about 0.1 mole per mole of hydrocarbyl vinyl ketone are preferred.

The reaction conditions.—The dimerization process is conducted in liquid phase solution. Solvents that are suitable are liquid at reaction pressure and temperature and are substantially inert towards addition to or reaction with the vinyl ketone reactant or the dimer product. Although solvents such as esters, ethers, saturated nitriles and the like are in part operable, preferred as solvents are the alcohols. The role of the solvent in the dimerization process is not clearly understood, but it is believed that an alcohol solvent serves as a source of hydrogen ions which effectively inhibit the production and propagation of the polymer chains which are customarily observed in reactions of readily polymerizable materials at elevated temperature. The use of alcoholic solvents enables utilization of relatively high reaction temperatures and yet retain selectivity for dimerization and retard polymerization. Preferred solvents are hydrocarbon monohydroxylic alcohols having from 1 to 10 carbon atoms which are free from non-aromatic unsaturation. However, primary alcohols, and to a lesser extent secondary alcohols, have a tendency to add to the ethylenic linkage of the unsaturated ketone reactant, and although primary and secondary alcohols, e.g., methanol, ethanol, isopropanol, sec-butyl alcohol, benzyl alcohol and the like, may be employed as reaction solvents, the advantages gained by the use of such an alcoholic solvent are somewhat offset by solvent addition to the ketone reactant. Best results are obtained when the reaction solvent is a tertiary alcohol, which alcohols appear to be sufficiently active to effectively retard polymerization but exhibit little tendency for addition to the unsaturated ketone reactant. Suitable tertiary hydrocarbonols have from 4 to 10 carbon atoms and include tert-butyl alcohol, tert-amyl alcohol, triethyl carbinol, diethyl methyl carbinol, phenyl dimethyl carbinol and propyl diethyl carbinol. Preferred tertiary hydrocarbonol solvents are alkanols, and particularly preferred as the reaction solvent is tert-butanol.

The solvent is employed in molar amounts in excess of the ketone reactant. Ratios of moles of solvent to moles of hydrocarbyl vinyl ketone from about 1.5:1 to about 20:1 are satisfactory, although molar ratios from about 2:1 to about 10:1 on the same basis are preferred.

The dimerization process is preferably conducted under substantially anhydrous conditions, as water is reactive toward the vinyl ketone under the conditions of the reaction. Although small amounts of water, e.g., up to about 1–2% of the reaction mixture, may be tolerated, the yield of desired product is lowered by the presence of water. The dimerization is also customarily conducted in an inert atmosphere, e.g., under an inert gas such as nitrogen, helium, argon or the like. It is sometimes desirable to include within the reaction mixture a small amount of an inhibitor in order to retard the deleterious effects of trace amounts of oxygen and other oxidizing agents. Conventional inhibitors such as hydroquinone, 2,6-di-tert-butyl-4-methylphenol, chloranil and the like are satisfactory. If an inhibitor is employed, and none is required, only small amounts are adequate, e.g., from about 0.01 to about 0.5 mole percent based upon the ketone reactant.

Although the dimerization process may be conducted by a variety of methods, the ketone reactant, solvent and catalyst are typically charged to an autoclave or similar reactor which is sealed and heated to reaction temperature. Suitable reaction temperatures range from about 50° C. to about 190° C., with temperatures from about 80° C. to about 150° C. being preferred, and temperatures from about 105° C. to about 130° C. being most satisfactory. The process may be conducted at any convenient pressure so long as the reactants are maintained in the liquid phase. Advantageous use is frequently made of the pressures generated when the reaction mixture is heated to reaction temperature in a sealed reaction vessel. Such pressures will be somewhat but not greatly higher than atmospheric pressure. At the end of the reaction time, which typically varies from about 1 to about 15 hours, the reactor is cooled and opened and the dimer product is recovered by conventional means such as fractional distillation, crystallization, selective extraction or the like.

The products.—The novel 1,5-diketone products of the process of the invention are 2,4-dihydrocarbonoyl-1-butenes. In terms of the preferred hydrocarbyl vinyl ketone reactants, the formation of product is illustrated by the following equation.

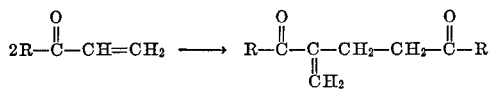

wherein R has the previously stated significance. The

radicals are corresponding hydrocarbonoyl radicals of one more carbon atom than the R or are named alternatively as hydrocarbylcarbonoyl radicals wherein the hydrocarbyl moiety is R. Other illustrative products include 2,4-dibenzoyl-1-butene from dimerization of phenyl vinyl ketone, 4-methylene-3,7-nonandione from dimerization of ethyl vinyl ketone, 2,4-bis(cyclohexylmethanoyl)-1-butene from dimerization of cyclohexyl vinyl ketone, 3-methylene-2,6-heptandiene from dimerization of methyl vinyl ketone, and other related products such as 2,2,8,8-tetramethyl-4-methylene-3,7-nonandione, 5 - methylene-1,10-undecadien-4,8-dione and 3,9-dimethyl-5-methylene-4,8-undecandione.

The novel products of the invention find utility in a variety of applications, particularly as chemical intermediates. For example, the 2,4-dihydrocarbonoyl-1-butene products are hydrogenated by conventional methods with hydrogenation catalysts such as platinum or Raney nickel to hydrocarbyl-substituted 1,5-pentanediols. Hydrocarbyl-substituted 1,5-pentanediols are reacted with organic diisocyanates such as hexamethylenediisocyanate and other co-reactants such as castor oil or polytetramethylene ether glycols to produce polyurethanes with useful properties such as transparency, high gloss, high abrasion resistance, good flexibility, high tensile strength and good adhesion as disclosed by U.S. Patent 2,901,467 of Croco, issued Aug. 25, 1959 and U.S. Patent 2,864,780 of Katz et al., issued Dec. 16, 1958. Useful polyurethanes are also prepared from 1,5-pentanediols by reaction with inorganic cyanates and chloromethylated aromatic hydrocarbons as disclosed by British Patent 794,061 of Haggis et al., issued Apr. 30, 1958, Hydrocarbyl-substituted 1,5-pentanediols are also reacted with formaldehyde to produce polyformal resins by the procedure disclosed by British Patent 850,178 to Hudson Foam Plastic Corp., issued Sept. 28, 1960. Esterification of hydrocarbyl-substituted, particularly alkyl-substituted, 1,5-pentanediols with carboxylic acids produce 1,5-pentanediol diesters which have established utility in many applications. For example, alkyl-substituted 1,5-pentanediol diesters and polyesters are useful as plasticizers and stabilizers for vinyl polymers and resins, such as polyvinyl chloride, as disclosed by U.S. Patent 2,766,266 of Emerson et al., issued Oct. 9, 1956, U.S. Patent 2,909,499 of Hoaglin et al., issued Oct. 20, 1959, British Patent 815,991 of Goodale et al., issued July 8, 1959 and British Patent 801,702 to Union Carbide Corp., issued Sept. 17, 1958. Alkyl-substituted 1,5-pentanediol esters are reacted with vinyl or allyl compounds to produce thermosetting polyester resins suitable for coatings by the procedure disclosed by German Patent 1,029,147 of Nischk et al., issued Apr. 30, 1958. Linear polycarbonate polymers of high tensile strength are prepared from bis(alkyl or aryl carbonate) diesters of alkyl-substituted 1,5-pentanediols as disclosed by U.S. Patent 2,789,968 of Reynolds et al., issued Apr. 23, 1957. Conversion of alkyl-substituted 1,5-pentanediols with pyroboric acid produces bis-cyclic borate esters which are useful as lubricant stabilizers as disclosed by U.S. Patent 2,931,774 to Irish, issued Apr. 5, 1960. Also, hydrocarbyl-substituted 1,5-pentanediols, can be converted to ethers, e.g., reaction with epihalohydrins produces diethers, useful as cross-linking agents for epoxide resins, by the procedure disclosed by U.S. Patent 2,921,050 of Belanger, issued Jan. 12, 1960.

The ethylenic unsaturation in the 2,4-dihydrocarbonoyl-1-butene serves as a reactive site for polymerization or copolymerization or alternatively can be epoxidized to form useful epoxy compounds. For example, the ethylenic unsaturation, being activated by conjugation with a carbonyl group, is epoxidized by the well-known alkaline hydrogen peroxide method under conventional reaction conditions to produce useful epoxy-carbonylic compounds. Furthermore, these epoxy-carbonylic compounds are converted by conventional methods to diepoxides or triepoxides as disclosed by U.S. Patent 2,980,707 of Williams et al., issued Apr. 18, 1961, and Newman et al., Org. Reactions, 5, 413 (1949). The epoxides prepared from the products of the invention are useful as reactive, epoxy-containing diluents for epoxy resins. In such applications the utility of the epoxides lies primarily in its ability to modify the viscosity of epoxy resins due to the cross-linking property inherent in the epoxy functional group; no further chemical changes are required to product the properties necessary for use as a diluent for epoxy resins. The utility of epoxides as diluents for epoxy resins is fully discussed in Lee et al., "Handbook of Epoxy Resins," McGraw Hill, New York, 1967, Chapter 13. Alternatively, the epoxides, particularly the diepoxides and triepoxides, are converted to useful epoxy resins by conventional methods as disclosed by Lee et al. in "Handbook of Epoxy Resins."

To further illustrate the process of the invention and the products thereof, the following examples are provided.

It should be understood that the details thereof are not to be regarded as limitations, as the teachings may be varied as will be understood by one skilled in this art.

Example I.—A solution of 20 g. (0.285 mole) of methyl ketone, 0.2 g. of hydroquinone and 1.85 g. (0.0073 mole) of triphenylphosphine in 100 g. of tertiary butyl alcohol in a glass-lined reactor was sealed under nitrogen and was maintained at 118±2° C. for 8 hours. At the conclusion of reaction, solvent and unreacted starting material were removed by distillation at reduced pressure. Analysis of the distillate by gas-liquid chromatography indicated at 60% conversion of the methyl vinyl ketone.

The residual product mixture was fractionally distilled to afford several fractions containing a total of 7.2 g. of 3-methylene-2,6-heptandione, as shown by gas-liquid chromatographic analysis. This represents a yield of 60% based on ketone converted. Redistillation of the two lower-boiling fractions afforded 4.3 g. of 99% pure 3-methylene-2,6-heptandione, B.P. 91–92° C. at 5 mm., M.P. 5–7° C. The elemental analysis was as follows:

*Analysis.*—Calc.: C, 68.5% wt.; H, 8.6% wt.; Molec. wt., 140. Found: C, 68.5% wt.; H, 8.7% wt.; molec. wt., 140.

Similar results were obtained when tritolylphosphine was employed as catalyst in place of the triphenylphosphine.

Example II.—When phenyl vinyl ketone is heated in tertiary butyl alcohol solution in the presence of a catalytic amount of triphenylphosphine, a good yield of 2,4-dibenzoyl-1-butene is obtained.

Example III.—When the procedure of Example I is repeated to dimerize tert-butyl vinyl ketone in tertiary amyl alcohol solution in the presence of a catalytic amount of diphenylxylylphosphine, a good yield of 2,2,8,8-tetramethyl-4-methylene-3,7-nonadione is obtained.

Example IV.—By a procedure similar to that of Example I, methyl vinyl ketone was reacted in tertiary butyl alcohol solution at 10° C. in the presence of tributylphosphine, a trialkylphosphine. A solid soluble polymer, of molecular weight approximately 1300, was formed in quantitative yield.

I claim as my invention:
1. 2,4-dihydrocarbonoyl-1-butene wherein the hydrocarbyl moieties independently are hydrocarbyl of from 1 to 6 carbon atoms and have only aromatic unsaturation.
2. The compound of claim 1 wherein the hydrocarbyl group is phenyl.
3. The compound of claim 1 wherein the hydrocarbyl group is methyl.
4. The process of producing 2,4-dihydrocarbonoyl-1-butene by dimerizing hydrocarbyl vinyl ketone of from 4 to 9 carbon atoms and having only aromatic unsaturation in the hydrocarbyl substituent, in the presence of a catalytic amount of hydrocarbon tertiary aromatic phosphine represented by the formula R'R'R'P or the formula R'R'—P—R''—PR'R', wherein R' independently is aryl or alkaryl having from 6 to 10 carbon atoms and R'' is a divalent arylene radical corresponding to R', in solution in tertiary hydrocarbonol of from 4 to 10 carbon atoms at a temperature of from about 50° C. to about 190° C.
5. The process of claim 4 wherein the tertiary aromatic phosphine is triarylphosphine wherein each aryl independently is aryl of from 6 to 10 carbon atoms.
6. The process of claim 5 wherein the ketone is methyl vinyl ketone.
7. The process of claim 5 wherein the ketone is phenyl vinyl ketone.
8. The process of claim 5 wherein the ketone is tert-butyl vinyl ketone.
9. The process of claim 5 wherein the triarylphosphine is triphenylphosphine, the tertiary alkanol is tertiary butyl alcohol and the temperature range is from about 80° C. to about 150° C.
10. The process of claim 9 wherein the ketone is methyl vinyl ketone.

References Cited

Horner et al.: Chemical Abstracts, 50, 2494g (1956).

DANIEL D. HORWITZ, *Primary Examiner.*

U.S. Cl. X.R.

252—49.6, 426; 260—45.85, 67, 75, 77.5, 348.5, 635, 638, 586, 593, 830